(12) United States Patent
Bitzer

(10) Patent No.: US 10,992,200 B2
(45) Date of Patent: Apr. 27, 2021

(54) ELECTRIC MOTOR WITH A CLAMPING ELEMENT

(71) Applicant: Robert Bosch GmbH, Stuttgart (DE)

(72) Inventor: Harold Bitzer, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 844 days.

(21) Appl. No.: 15/729,108

(22) Filed: Oct. 10, 2017

(65) Prior Publication Data

US 2018/0109158 A1 Apr. 19, 2018

(30) Foreign Application Priority Data

Oct. 14, 2016 (DE) .................... 10 2016 220 109.3
Sep. 12, 2017 (DE) .................... 10 2017 216 074.8

(51) Int. Cl.
  *H02K 3/38* (2006.01)
  *H02K 3/32* (2006.01)
  *H02K 3/34* (2006.01)

(52) U.S. Cl.
  CPC .............. *H02K 3/38* (2013.01); *H02K 3/325* (2013.01); *H02K 3/345* (2013.01)

(58) Field of Classification Search
  CPC .......... H02K 3/38; H02K 3/325; H02K 3/345; H02K 3/34; H02K 3/50
  USPC ..................................................... 310/215
  See application file for complete search history.

(56) References Cited

U.S. PATENT DOCUMENTS 9,755,472 B2 * 9/2017 Welch ...................... H02K 3/51
9,819,241 B2 * 11/2017 Smith ..................... H02K 7/145
10,069,351 B2 * 9/2018 Kageme ................. H02K 21/22
10,491,057 B2 * 11/2019 Seki ...................... H02K 3/522
10,574,113 B2 * 2/2020 Bitzer .................... H02K 3/345
2002/0047331 A1 * 4/2002 Takayanagi ........... H02K 15/12
                                                              310/45

(Continued)

FOREIGN PATENT DOCUMENTS

CN        102754313 A        10/2012
CN        103715792 A         4/2014
(Continued)

OTHER PUBLICATIONS

Received STIC search report from EIC 2800 searcher Mesfin Getaneh dated Jan. 6, 2020. (Year: 2020).*

*Primary Examiner* — Shawki S Ismail
*Assistant Examiner* — Htet Z Kyaw
(74) *Attorney, Agent, or Firm* — Michael Best & Friedrich LLP

(57) ABSTRACT

An electric motor (1) comprising an armature (10) having a plurality of teeth (20), and slots (30) configured between the teeth (20), at least one winding (40), which is constituted by a winding conductor (42), wherein at least part of the winding (40) is accommodated within one of the slots (30), a first guide (52) and a second guide (52), respectively having a spacer (56) and a guide slot (54), configured within the slot (30), wherein a winding conductor section (44) of the winding conductor (42) is guided at least in one of the guide slots (54), and wherein the spacer (56) separates the winding conductor section (44) from the winding (40), wherein the free ends of the spacer (56) and the openings in the guide slots (54) are configured in a mutually facing arrangement.

20 Claims, 6 Drawing Sheets

(56) References Cited

U.S. PATENT DOCUMENTS

| | | | | |
|---|---|---|---|---|
| 2007/0296292 A1* | 12/2007 | Kienzler | ............... | H02K 3/522 |
| | | | | 310/71 |
| 2010/0295394 A1* | 11/2010 | Sahara | .................. | H02K 11/33 |
| | | | | 310/71 |
| 2013/0200742 A1* | 8/2013 | Seki | ...................... | H02K 1/148 |
| | | | | 310/195 |
| 2013/0270934 A1* | 10/2013 | Smith | .................... | H02K 7/145 |
| | | | | 310/50 |
| 2014/0009029 A1* | 1/2014 | Schmid | ................. | H02K 1/265 |
| | | | | 310/208 |
| 2014/0363320 A1* | 12/2014 | Hayakawa | ............... | H02K 3/46 |
| | | | | 417/420 |
| 2015/0295371 A1* | 10/2015 | Houzumi | ........... | H02K 11/0094 |
| | | | | 310/71 |
| 2016/0013691 A1 | 1/2016 | Houzumi et al. | | |
| 2017/0141627 A1* | 5/2017 | Seki | ...................... | H02K 1/148 |

FOREIGN PATENT DOCUMENTS

| | | | |
|---|---|---|---|
| CN | 102064447 B | * | 11/2014 |
| CN | 104578463 A | | 4/2015 |
| DE | 102010000710 A1 | | 7/2011 |
| DE | 102014201490 A1 | | 8/2015 |
| DE | 102015200093 A1 | | 7/2016 |
| EP | 1947755 A1 | | 7/2008 |
| JP | 2013110868 A | | 6/2013 |

\* cited by examiner

ELECTRIC MOTOR WITH A CLAMPING ELEMENT

BACKGROUND OF THE INVENTION

The invention relates to an electric motor having an armature, a guide means and a clamping element.

An electric motor, comprising an armature having a plurality of teeth and a plurality of slots, is already known. It is also known that a winding conductor, which constitutes a winding, is electrically insulated from the armature by means of an insulating material.

SUMMARY OF THE INVENTION

The invention provides an electric motor comprising an armature having a plurality of teeth, and slots configured between the teeth, at least one winding which is constituted by a winding conductor, a first guide means and a second guide means respectively having a spacer and a guide means slot, configured within a slot, wherein a winding conductor section of the winding conductor is guided at least in one of the guide means slots, and wherein the spacer separates the winding conductor section from the winding, wherein the free ends of the spacer and the openings in the guide means slots are configured in a mutually facing arrangement, characterized in that a clamping element having a base clamp with a free end is provided, wherein the base clamp comprises a first partial element and a second partial element, wherein the first partial element retains at least one winding conductor section in the guide means slot, and wherein the second partial element is arranged between the ends of the spacer.

The electric motor according to the invention has the advantage in that the winding conductors are brought out of the motor in a defined position. It is further advantageous that the winding conductor is protected against the action of external forces, specifically in the region of departure from the armature. It is further advantageous that, during assembly, the winding wires are not displaced within the slot.

It is particularly advantageous that the first partial element and the second partial element, in the direction of the free end of the base clamp, taper in their respective cross-sectional area. The assembly of the electric motor is simplified accordingly.

Advantageously, the base clamp, specifically the first partial element of the base clamp, constitutes an electrical insulator. Preferably, all the base clamps, specifically the first partial elements of the base clamps, constitute insulators. The base clamp is comprised of an electrically insulating material. Preferably, at least one base clamp, specifically the first partial element of the base clamp, is comprised of an electrical insulator. Specifically, the surface of the base clamp, at least in the region which is oriented towards the winding conductor upon the retention thereof in the slot, and specifically is in contact therewith, is configured as an electrical insulator. Advantageously, simple assembly is permitted, specifically by the exclusion of the formation of a short-circuit by the clamping element.

Particularly advantageously, the base clamp, during the retention of at least one winding conductor section in the guide means slot, specifically in combination with the guide means, insulates the winding conductor section from its surroundings. The base clamp at least partially constitutes an insulator. Preferably, the base clamp is configured as an insulator in the region thereof which is oriented towards the winding conductor section, and specifically is in contact with the latter. The guide means constitutes an electrical insulator. Advantageously, with a consistently simple assembly, for example, any unwanted electrification of the surroundings is prevented.

Advantageously, the base clamp retains a first winding conductor section in a first guide means slot, and retains a second winding conductor section in a second guide means slot. Preferably, the base clamp insulates the first winding conductor section from the second winding conductor section, and vice versa. The first winding conductor section and the second winding conductor section are electrically insulated by the base clamp. Specifically, the base clamp, in combination with the first guide means and the second guide means, insulates the first winding conductor section and the second winding conductor section, both from each other and from their surroundings. Advantageously, notwithstanding the simplification of assembly, the mode of operation of the electric motor is still specifically guaranteed.

Advantageously, at least one base clamp, and preferably all the base clamps, incorporate an electrically insulating material, for example a plastic or a resin, and are preferably constituted of the latter. The material is specifically an epoxy resin, or a specifically glass-fiber-reinforced plastic. No electric current flows via the clamping element between the winding conductor sections. Preferably, at least the part of the base clamp, specifically the surface of the base clamp, which is oriented towards a winding conductor section, and specifically can contact the latter, or is in contact therewith, is configured as an electrical insulator.

It is particularly advantageous that the first and/or the second partial element, in their respective cross-section, are configured with a wedge-shaped, pyramidal or conical taper. The taper permits the simple fitting of the clamping element to the armature.

Advantageously, the second partial element tapers over the entire length of the base clamp. The taper of the second partial element over its entire length permits the straightforward centering of the base clamps between the spacers.

It is considered advantageous that at least a subregion of the base clamp, considered in cross-section, is configured with a T-shape. The cross-section of the base clamp is configured to match at least one guide means, and specifically both guide means, which are configured within a slot. The T-shaped configuration enhances the stability of the base clamp. The T-shaped configuration improves the retention of at least one winding conductor section within a guide means slot. The T-shaped region, considered in cross-section, is comprised of a combination of the first partial element and the second partial element.

Advantageously, the first partial element extends over the entire length of the base clamp. It is further advantageous that the first partial element extends over the entire length of the armature. The attachment of the winding conductor section is thus ensured over the entire guide means slot in which the winding conductor is guided. It is moreover advantageous that the first partial element and the second partial element are essentially of equal length. An improvement of both rigidity and stability is achieved accordingly.

Particularly advantageously, the clamping element comprises a base element, specifically of an essentially annular design. The base element permits the simple mutual orientation of the clamping elements. The base element moreover simplifies the fitting of the base element to the armature. It is further advantageous that, by means of the annular configuration of the clamping element, an axial attachment of the winding, in that part of the winding conductor which adjoins the winding conductor section, is achieved.

Advantageously, the base element incorporates a locking means. The armature or the insulating element incorporates a retention means. The locking means and the retention means are configured such that the clamping element and the armature are connectable to each other in a detachable arrangement. The locking means and the retention means permit the simple connection of the clamping element to the insulating element or the armature.

Advantageously, at least one of the locking means has a latch, which engages with a recess in the retention means. A simply-produced snap-on connection is facilitated accordingly.

Advantageously, the winding conductor is brought out of the armature in the axial direction, thereby simplifying the electrical bonding of the winding, for example with a control board. Preferably, electrical bonding proceeds directly between the winding conductor and the control board.

Particularly advantageously, the guide means forms part of the insulating element. The insulating element is specifically configured on the armature in the region of the teeth. The guide means separates the windings from the armature. The insulating element constitutes an electrical insulator.

It is considered advantageous that each guide means is configured such that the guide means slot can only accommodate one winding conductor section. An optimum locked engagement of the winding conductor section within the guide means slot is thus ensured. Preferably, a part of the first partial element is configured within the guide means slot.

Advantageously, the guide means is configured on the slot base of a slot.

Advantageously, the first partial element and the second partial element are configured in a one-piece arrangement. Stability and manufacture, together with fitting, are simplified accordingly.

Advantageously, the armature is an element of a stator of the electric motor. The electric motor is preferably an element of a ventilator, specifically for the cooling of a combustion engine or an electric drive motor, a HVAC fan or a coolant pump. Preferably, the electric motor is configured as an external-rotor motor, wherein the armature constitutes the stator of the electric motor.

BRIEF DESCRIPTION OF THE DRAWINGS

Exemplary embodiments are represented in the figures, and are described in greater detail in the following description. Herein.

DETAILED DESCRIPTION

Figure 1:
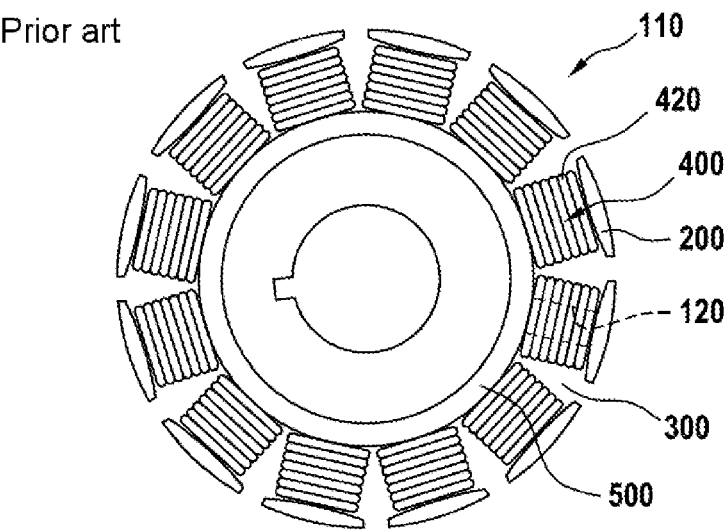
FIG. 1 shows a known armature of an electric motor from the prior art.

FIG. 1 shows a known armature 110 of an electric motor from the prior art. The armature 110 incorporates a plate stack 120. The plate stack is comprised of a plurality of plates. The armature 110 comprises teeth 200, around which winding wires 420 are wound. The winding wires 420 form windings 400, which are necessary for the operation of the electric motor. Slots 300 are configured between the teeth 200. The teeth 200 are mutually separated by the slots 300. An insulating element 500 electrically isolates the winding wires 420 of the windings 400 from the plate stack.

Figure 2:
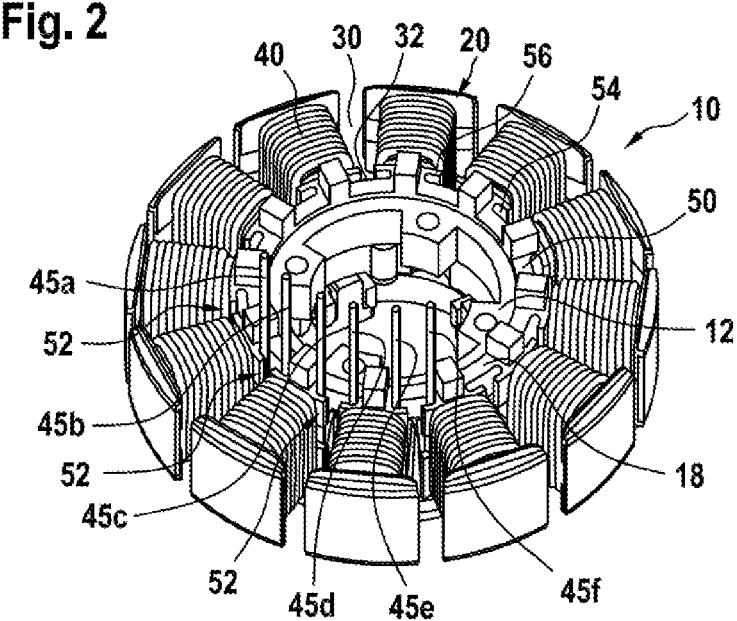
FIG. 2 shows a perspective view of an armature.

FIG. 2 shows a perspective view of an armature 10 for an electric motor 1 according to the invention. The armature 10 has a plurality of teeth 20. The teeth 20 are mutually separated in the circumferential direction by means of slots 30. The armature 10 further incorporates an armature body 18. The armature body 18 is configured with an annular design. The armature body 18 has an outer circumferential surface, upon which the teeth 20 are configured. The armature body 18 and the teeth 20 are specifically constituted by a plate stack 12. The plate stack 12 is comprised of a plurality of individual plates 14, which are arranged one next to another, specifically in the axial direction of the electric motor 1, in a layered arrangement. The individual plates 14 can specifically be mutually separated by individual insulating layers.

According to FIG. 2, for exemplary purposes, the electric motor 1 comprises three winding conductors 42. A winding 40 is formed by the winding of a winding conductor 42 around a tooth 20. Preferably, each tooth 20 has at least one winding 40, which is constituted by a winding conductor 42. Depending upon the type and the control mode of the electric motor 1, one or more windings 40 are configured per tooth 20. The armature according to FIG. 2 is configured for an electrically-commutated motor with three phases. Each of the three phases is constituted by a winding conductor 42. A winding conductor 42 can also be wound around more than one tooth 20, thereby constituting more than one winding 40. For exemplary purposes, the armature 10 illustrated in FIG. 2 has twelve teeth 20. Each of the three winding conductors 42 is wound around four teeth, such that a winding 40 is respectively formed on four teeth 20. The armature 10 can be an element of the rotor or of the stator.

For exemplary purposes, the armature 10 illustrated in FIG. 2 constitutes a stator, or is an element of a stator. The electrical machine 1 further comprises a rotor or an inductor. In the interests of clarity, the rotor is not represented. According to FIG. 2, the electrical machine 1 is specifically configured as an external-rotor motor, meaning that the rotor rotates around the armature 10. The rotor is arranged to rotate around its shaft. The shaft 3 is rigidly connected to the housing element 5. According to a further development of the invention, the rotor is rigidly connected to the shaft, and the shaft is arranged to rotate in relation to the housing element or in relation to the armature 10.

A current flux through the winding conductor 42 results in the generation of a magnetic field, thereby resulting in a rotary motion of the rotor or inductor of the electric motor 1. Correspondingly, the rotor or inductor incorporates magnets, ferrite elements or elements which interact with the magnetic field generated by the energization of the windings 40.

Each winding conductor 42 comprises at least a first winding conductor section 44 and a second winding conductor section 45. Preferably, each winding conductor 42 has the first winding conductor section 44 and the second winding conductor section 45 in duplicate. Preferably, the first winding conductor section 44 adjoins the second winding conductor section 45. The two winding conductor sections 44, 45 are respectively arranged in the region of one of the two ends of the winding conductor 42. Specifically, the second winding conductor sections 45a, 45b, 45c, 45d, 45e, 45f constitute the conductor ends. The second winding conductor section 45 is configured such that it permits the formation of an electrical connection, for example with an electric circuit board which delivers, for example, an electrical control function. Preferably, the second winding conductor section 45 runs away from the armature 10 in the direction of the circuit board. According to FIG. 2, for example, six second winding conductor sections 45a, 45b, 45c, 45d, 45e, 45f protrude. Two of the second winding conductor sections 45a, 45b, 45c, 45d, 45e, 45f shown respectively constitute an element of a winding conductor 42.

The first winding conductor section 44 connects to the elements of the winding conductor 42 which constitute at least one winding 40 wound around at least one tooth 20.

The electric motor 1 according to the invention further incorporates an insulating element 50. The insulating element 50, at least in one slot 30, is provided with a guide means 52. The function of the guide means 52 is the guidance of the first winding conductor section 44 of the winding conductor 42. Guidance of the first winding conductor section 44 is achieved by the arrangement of the first winding conductor section 44 of the winding conductor 42 within the guide means 52.

According to a further development, the insulating element 50 extends to at least one tooth 20. In the region of the teeth 20, the insulating element 50 assumes the function for the prevention of an electrical connection between the winding conductor 42 and the armature 10. The insulating element 50 further prevents the occurrence of any damage during the winding of the windings 40. Specifically, the first insulating element 50 prevents damage to the coating of the winding conductor 42 in the region of the edges of the uppermost plate 14 in the plate stack 12.

The insulating element 50 is specifically formed by the molding of an electrically insulating material onto the armature 10. The insulating element 50 constitutes an electrical insulator. The insulating element 50 can further be constituted by an element which is specifically arranged on the armature in an axial direction of the electric motor 1, specifically in a plug-in arrangement. Furthermore, the insulating element 50 can be composed of a number of elements. The insulating element 50 preferably incorporates, and specifically is comprised of, a plastic or resin.

The axial direction of the electric motor 1 corresponds to the longitudinal direction of the electric motor 1. The axial direction specifically projects perpendicularly outwards from FIG. 3. The axial direction of the electric motor 1 runs parallel to the axle or shaft of the electric motor 1. It is further assumed hereinafter that the longitudinal direction and the axial direction of the electric motor 1 are identical. It is also assumed hereinafter that the longitudinal direction of the armature 10 corresponds to the axial direction of the electric motor 1. Moreover, the longitudinal direction of the teeth 20 is perpendicular to the axial direction of the electric motor 1.

Figure 3:
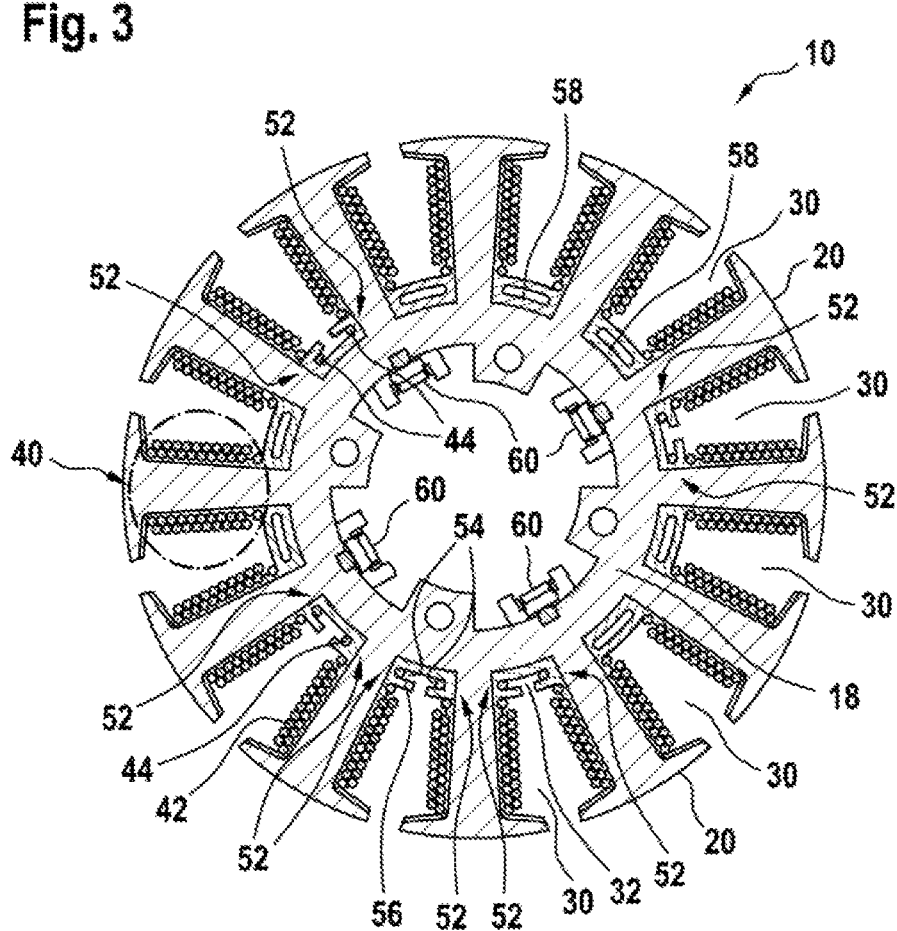
FIG. 3 shows a sectional view of an armature, the windings and the guide means.

FIG. 3 shows a sectional view of the armature 10 of the electric motor 1 according to the invention. The slots 30 are configured between the teeth 20. Each slot 30 has a slot base 32. The slot 30 extends, specifically in a radial direction, from the outer circumference of the armature 10 to the slot base 32. The slot base 32 is partially constituted by the outer circumference of the armature body 18. In a configuration represented in FIGS. 2 and 3, the slot 30 originates on the outer circumference of the armature 10, and runs between the teeth 20 in the direction of the shaft or the mid-point of the electric motor 1. The slot 30 thus extends inwards. Within the slot 30, specifically in the region of the slot base 32, two guide means 52 are configured.

The guide means 52 respectively comprise a guide means slot 54 and a spacer 56. A guide means 52 separates a first winding conductor section 44, by means of the spacer 56, from that part of the or a winding conductor 42 which is wound around the tooth 20 to form a winding 40. The guide means 52, specifically the spacer 56, separates the winding conductor section 44 from the remainder of the winding conductor 42. The spacer 56 also separates the first winding conductor section 44, within the guide means 52, from further first winding conductor sections 44.

The length of the spacer 56, specifically the length thereof in the circumferential direction of the armature 10, at least corresponds to the thickness of the windings 40 within a slot 30. A configuration of this type prevents any slippage of elements of the winding 40 in the guide means slot 54.

The guide means slots 54 incorporate an opening. The openings in the guide means slots 54, or the openings in the guide means 52 which are arranged within a slot 30, are, specifically, essentially mutually facing. The opening in the guide means extends over the entire length of the guide means 52. The guide means 52 or the guide means slots 54 are specifically oriented in the longitudinal direction of the armature 10. The guide means 52 guide the first winding conductor section 44 in the axial direction of the armature 10.

According to FIG. 2, the second winding conductor section 45 connects to the first winding conductor section 45. The second winding conductor section 45 is essentially oriented away from the armature 10 in the axial direction. The function of the second winding conductor section 45 is the electrical bonding of the windings 40, for example with an electronic circuit. By the axial orientation of the second winding conductor section 45 away from the armature 10, it can be achieved, for example, that the electronic circuit can simply be arranged on the armature 10 in the axial direction. Further to the arrangement of the control electronics at the end of the second winding conductor section 45, the latter can be electrically bonded to the electronics circuit, specifically to a circuit board, for example by means of a soldering process.

The armature body 18 of the armature 10 has an outer and an inner circumferential surface. The teeth 20 are configured on the armature body 18, perpendicularly to the outer circumferential surface or radially to the axle or shaft of the electric motor 1. The inner circumferential surface delimits a notional cylinder in the radial direction. The cylinder can extend, as required, in the axial direction of the electric motor 1, or contrarily thereto. Specifically, the notional cylinder constitutes an inner surface.

Filler elements 58 are further configured in the slot base 32 of a number of the slots 30. The filler elements 58 specifically form part of the insulating element 50. They are configured in place of the two guide means 52, which are configured within a slot 30. The filler means 58 occupy the same space as the two guide means 52. They permit the uniform winding of the armature 10, without the configuration of a guide means 52 in each slot base 32. The filler means 58 are specifically of solid design, or are configured with a recess. The clearance between the outer radial surface of the spacer 56 and the tooth crest is equal to the clearance between the outer radial surface of the filler element 58 and the tooth crest.

Figure 4:
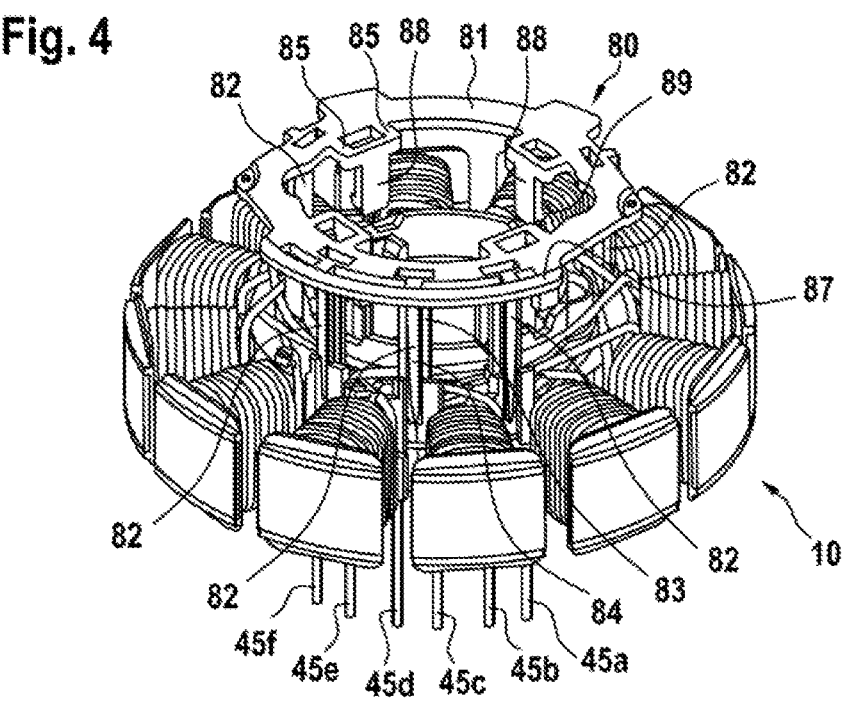
FIG. 4 shows a perspective view of an armature with an insulating element, and of the clamping element.

FIG. 4 shows a perspective view of the armature 10 and of the clamping element 80. The clamping element 80 incorporates a base element 81. The base element 81 is essentially configured with an annular design. The annular region ensures that the part of the winding wires 42 which connects to the first winding conductor section 44, and is oriented in parallel with the surface of the base element 81 on the tooth, is axially secured. The base element 81 is configured with a flat design. The base element 81 has an outer radius and an inner radius, originating from the shaft of the electric motor 1. The outer radius essentially corresponds to the outer radius of the armature body 18. The inner radius essentially corresponds to the inner radius of the armature body 18.

A compression means 87 is configured on the base element 81. The compression means 87 extends in the radial direction, at least over part of the circumferential surface of the base element 81. The compression means 87 cooperates with an element of the windings 40 in the region of the slot base 32. It prevents any axial displacement of the first winding conductor 44, wherein it constitutes a limit stop. It is preferably connected to the base element 81, specifically by means of radially-configured webs. The compression means 87 is configured in the region of the base element 81 which is arranged opposite the axially brought-out second winding conductors 45a to 45f.

At least one base clamp 82 is configured on the clamping element 80. The base clamp 82 has a free end. According to FIG. 4, the free end is oriented towards the armature 10. Preferably, according to FIG. 4, five base clamps 82 are configured. The base clamps 82 are configured with a mutual clearance in the circumferential direction. Preferably, five base clamps are configured. Three base clamps 82 are essentially configured with a clearance of one tooth's width, specifically 25 to 30 degrees. Three base clamps 82 are configured with an equal clearance in the circumferential direction, specifically 115 to 120 degrees. Respectively in and conversely to the circumferential direction, on one of the three base clamps 82, a further base clamp 82 is configured respectively, having a smaller clearance in the circumferential direction. The clearance between the three adjoiningly arranged base clamps 82 and the base clamps 82 arranged in isolation is essentially equivalent to three teeth 20. The clearance between the base clamps arranged in isolation is approximately equivalent to four teeth or 120 degrees. The configuration of the base clamps 82 on the base element 81 corresponds to the configurations of the guide means 52 provided by the insulating element 50. Specifically, the mutual clearance between three base clamps 82 in the circumferential direction is smaller than the clearance to the two further base clamps 82. The base clamps 82 are distributed over the base element 81. By the distribution of the base clamps 82 over the entire base element 81, the optimum distribution of resulting forces can be achieved. The base clamps 82 are arranged on the base element 81, perpendicularly to the surface of the base element 81. The longitudinal axis of the base clamps 82 is thus oriented perpendicularly to the surface of the base element 81 of the clamping element 80. The base clamps 82 are oriented in the axial direction of the electric motor 1. The longitudinal axis of the base clamps 82 is oriented in parallel with the longitudinal axis of the electric motor 1.

At least one locking means 88 is further configured on the clamping element 80. According to FIG. 4, for example, four locking means 88 are configured.

The locking means 88 are configured on the inner circumference of the clamping element 80. The locking means 88 preferably project from the inner circumference of the base element 81. The locking means 88 extend in the axial direction of the electric motor 1. The locking means 88 are configured such that, further to the fitting thereof, they form a detachable connection, specifically a detachable latching connection, with the armature 10, specifically with the insulating element 50. The insulating element 50 incorporates retaining elements 60, which are configured to match the locking means 88. The locking means 88 incorporate a latching element 89. The latching element 89 is specifically configured as a latch.

The latching elements 89, further to the fitting of the clamping element 80 to the armature 10, form a latching connection to the armature 10. The latching connection is specifically formed between the latching element 89 and correspondingly configured retaining means 60 on the insulating element 50. The retaining means 60 can specifically be configured as recesses, loops or edges. The latch projects radially outwards in the direction of the teeth 20. The latch 89 engages with the retaining means 60. The locking means 88 are connected to the base element 31 by means of two webs 85. The webs 85 are oriented here in the radial direction. The locking means 88 is arranged in the circumferential direction between two webs 85. A feed-through opening is configured between the locking means 88 and the base element 81. By means of the webs 85, the elastic deformation of the locking means 88 during assembly is possible.

The base element 81, the base clamps 82, the compression means 87 and the locking means 88 are configured in a one-piece arrangement. The base element 81, the base clamps 82 and the locking means 88 are specifically configured as a plastic component.

Specifically, the clamping element 80 constitutes an electrical insulator. The base element 81, the base clamps 82 and the compression means 87 are preferably comprised of an electrically insulating material. The base element 81, the base clamps 82 and the compression means 87 are specifically comprised of plastic. The base element 81, the base clamps 82 and the compression means 87 have at least one electrically insulating surface. The base clamps 82, specifically the first partial element 83 thereof, constitute an electrical insulator. The base clamps 82 conduct no electric current between the winding conductor sections 44. The base clamps 82 are configured as electrical insulators. The clamping element 80 forms no electrical connection between two winding conductor sections 44. Preferably, the electrical insulation of at least one base clamp 82 is restricted to the surface of the base clamp 82, specifically the surface of the first partial element 83 of the base clamp 82. At least one, and specifically all the base clamps 82 have an insignificantly low electrical conductivity. At least one, and specifically all the base clamps 82 are formed of an insulating material. The clamping element 80 specifically constitutes an insulator, and preferably incorporates an electrically insulating material. The base clamps 82, which retain a winding conductor section 44 in the guide means slot 54, constitute an electrical insulator. They ensure the mutual insulation of the winding conductor sections 44 which are arranged specifically within a slot. Preferably, an electrical insulator has no, or only a negligible electrical conductivity.

Figure 5:
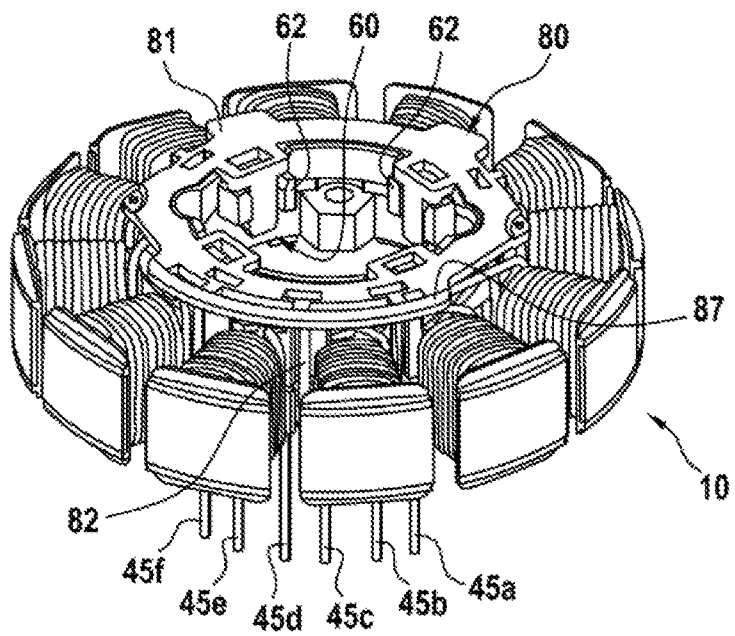
FIG. 5 shows a perspective view of a clamping element after the fitting thereof to the armature.

FIG. 5 shows a perspective view of the armature 10. The clamping element 80 is arranged on the armature 10 or on the insulating element 50 of the armature 10. The base clamps 82 have been inserted into the insulating element 50 in the axial direction. The base clamps 82 have previously been inserted, at their free ends, into the armature 10.

Specifically, the base clamps 82 have been inserted in the region of the guide means 52. The locking means 88 form a latching connection with the retaining means 60 on the insulating element 50. The compression means 87 constitutes a limit stop for the winding conductors 42. The base clamps 82 retain the winding conductor sections 44 in the guide means slot 54.

The retaining means 60 are provided with a retaining means limiter 62. Each retaining means 60 has two retaining means limiters 62. The retaining means limiters 62 are configured on the inner circumferential surface of the insulating element 50. They form a limit stop in the circumferential direction for the locking means 88. Specifically, after assembly, the locking means 88 are configured between two retaining means limiters 62. Preferably, the locking means 88 are in contact with both retaining means limiters 62 in the circumferential direction. The locking means 88 incorporates a taper at its free end, which permits the more effective connection of the insulating element 50 with the clamping element 80. The tapers are specifically configured as corner radii.

Figure 6:
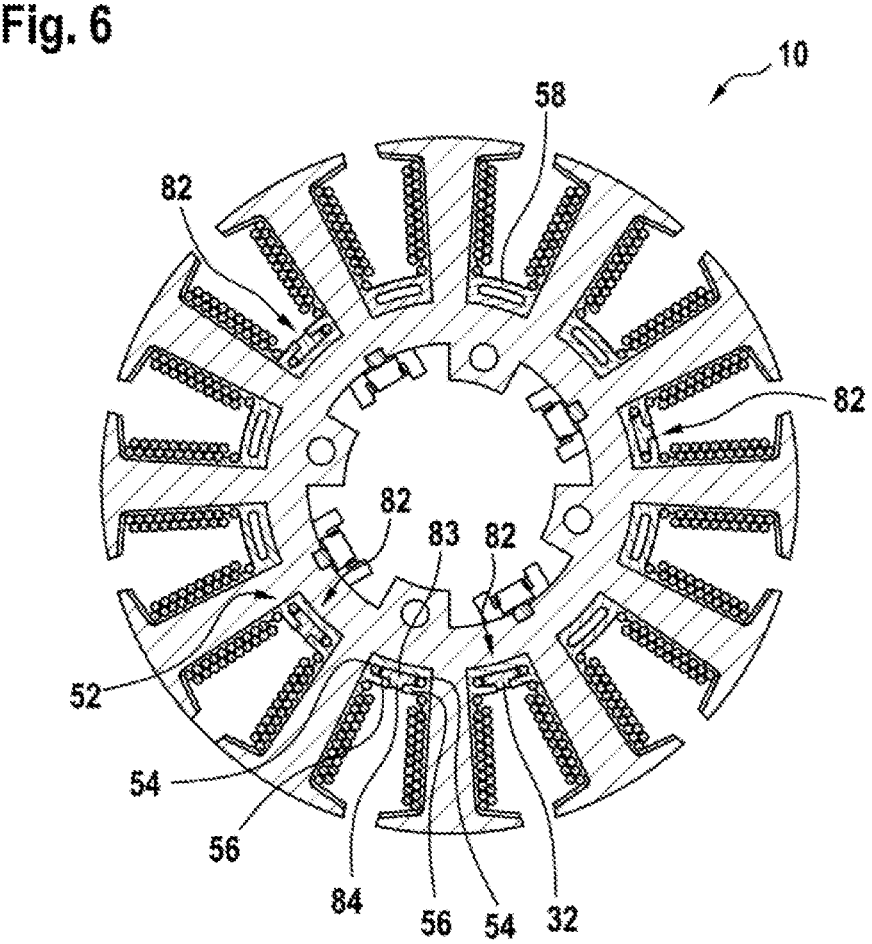
FIG. 6 shows the sectional view represented in FIG. 3, wherein the clamping element is arranged on the armatures.
Figure 7:
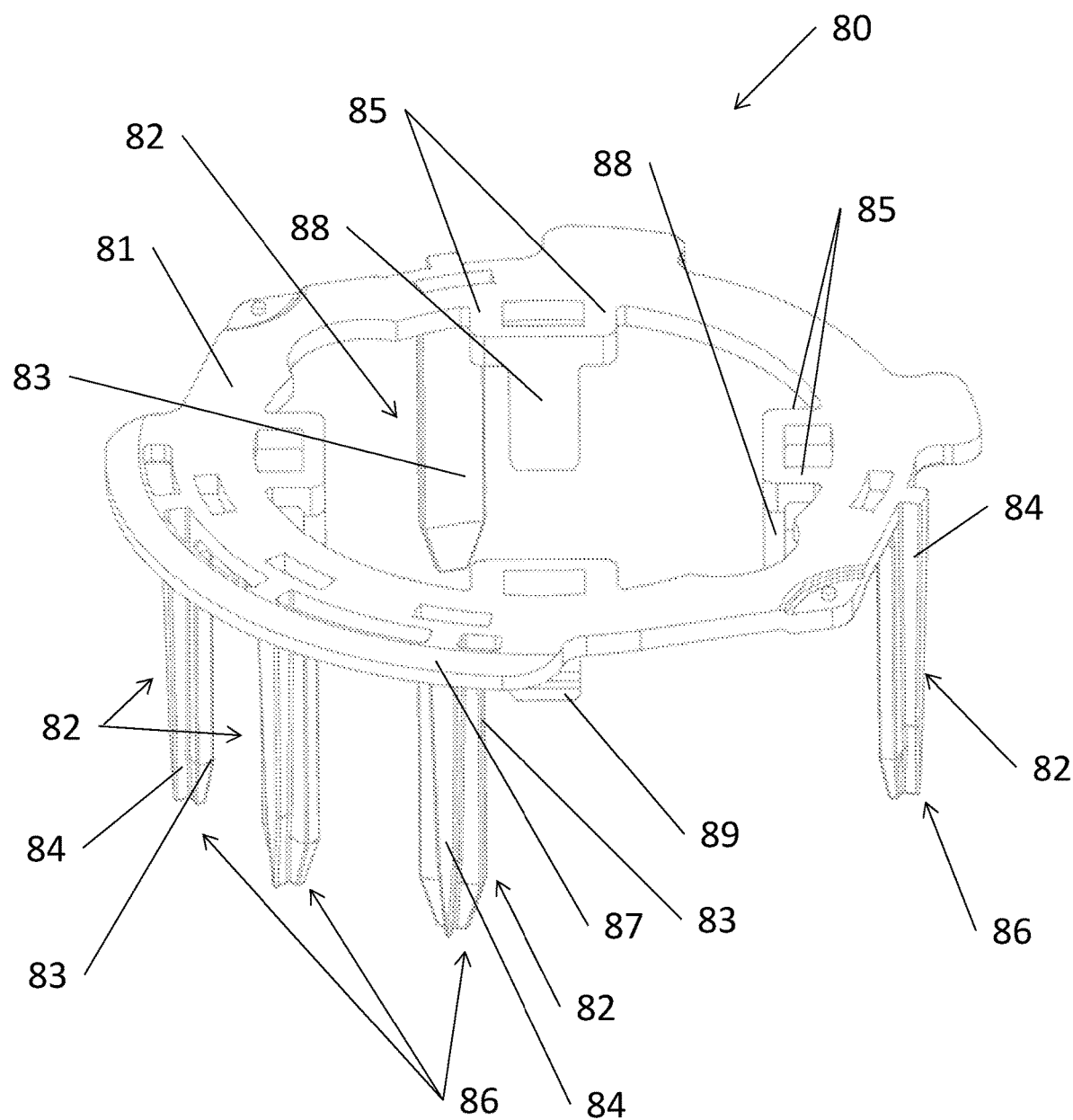
FIG. 7 shows a perspective view of the clamping element of FIGS. 4-6.
Figure 8:
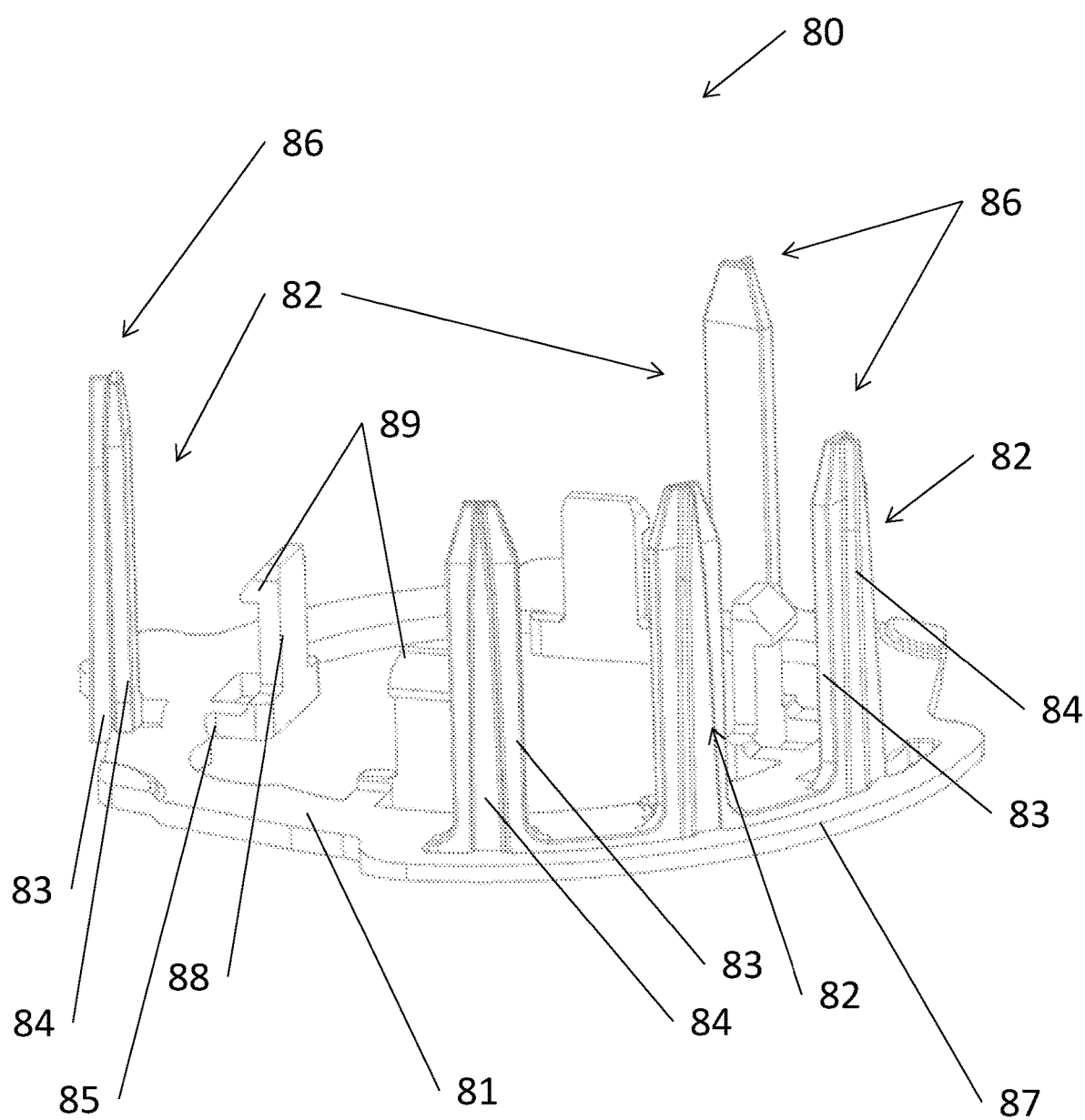
FIG. 8 shows another perspective view of the clamping element of FIG. 7.

FIG. 6 shows a sectional view according to FIG. 3, but with base clamps 82 which, further to the fitting of the clamping element 80 on the armature 10, are arranged within the slot base 32. The base clamps 82 comprise a first partial element 83 and a second partial element 84. The first partial element 83 clamps at least one winding conductor section 44, specifically a first winding conductor section 44, in the guide means slot 54. The first partial element 83 retains the winding conductor section 44 within the guide means slot 54. The first partial element 83 prevents any displacement or slippage of the winding conductor section 44, or of the two first winding conductor sections 44, in the guide means slots 54, specifically as a result of vibrations. The winding conductor sections 44 lie on the outer surfaces, which are configured in the circumferential direction on the first partial element 83. Expansion in the circumferential direction of the first partial element 83 is selected such that a movement of the winding conductor section 44 within the guide means slot 54 in the circumferential direction of the armature 10 is not possible. The first partial element 83 contacts the winding conductor sections 44, further to the fitting of the base clamp 82 on the armature 10. According to a further development of the invention, the first partial element 83 and the winding conductor sections 44 are configured with a clearance. However, the clearance is very small, i.e. smaller than the diameter of the winding conductor section 44. The first partial element 83 is configured as an insulator. The first partial element 83 and the guide means slot 54 constitute an insulator, which insulates the winding conductor section 44 from other winding conductor sections 44, or from the surroundings.

The second partial element 84 is configured between the ends of the spacers 56. The second partial element 84, further to assembly, is configured between the spacers 56 in a slot. Specifically, the outer surfaces of the second partial element 84, which are configured in the circumferential direction, lie on the ends of the spacers 56 or are in contact with the latter.

The first partial element 83 and the second partial element 84 are configured with a T-shaped cross-section. The first partial element 83 and the second partial element 84 are specifically configured in a one-piece arrangement. The T-shaped design is necessary for the stability/right-angularity of the long base clamps 82. The expansion of the first partial element 83 in the circumferential direction is greater than that of the second partial element 84. The first partial element 83 and the second partial element 84 constitute an insulator.

The first partial element 83 and the second partial element 84, originating from the base element 81, taper in their respective cross-section in the direction of the free end of the base clamp 82. Specifically, the cross-section shows a wedge-shaped, pyramidal or conical taper. The free end of the base clamp 82 essentially assumes the shape of a wedge, a pyramid or a cone base. For example, the second partial element 84 in FIGS. 4 and 5 is configured with a wedge shape.

The second partial element 84 tapers over the entire length of the base clamp 82. Specifically, the second partial element 84 is configured with a wedge shape over its entire length. The wedge-shaped configuration has the advantage, in that the base clamp 82 can be simply inserted between the ends of the spacers 56. The wedge shape moreover permits the centering of the clamping element 80 in relation to the armature 10 during assembly. Preferably, as the depth of insertion increases, the wedge shape results in the clamping of the clamping element 80, together with the spacers 56 and the winding conductor sections 44.

The second partial element 84 extends over the entire length of the base clamp 82. The first partial element 83 extends over the entire length of the base clamp 82. The first partial element 83 and the second partial element 84 are configured with an equal length.

In the first partial element 83, the taper of the cross-section does not extend over the entire length of the partial element. Specifically, the taper only extends over 10% to 40%, specifically one quarter, of the total length of the first partial element 83. The taper originates from the free end, in the direction of the base element 81. Preferably, the free end of the first partial element 83 is configured in the form of a truncated wedge or a truncated pyramid. Specifically, only those regions which are oriented towards the winding support are tapered. The major part, specifically approximately 60-80% of the first partial element 83, has no taper.

The wedge-shaped design of the first partial element 83 only extends over a partial region, in relation to the overall length of the base clamp 82. Accordingly, the first winding conductor section 44, over the entire length of the base clamp 82, is uniformly secured in the guide means slot 52, or is retained therein.

What is claimed is:

1. An electric motor, comprising:
 an armature having a plurality of teeth and slots between the teeth,
 a first winding constituted by a first winding conductor wound around a first tooth of the plurality of teeth,
 a second winding constituted by a second winding conductor wound around a second tooth of the plurality of teeth,
 the first tooth being adjacent to the second tooth and one of the slots being between the first tooth and the second tooth,
 a first guide means adjacent the first tooth and having a first spacer and a first guide means slot, and
 a second guide means adjacent the second tooth and having a second spacer and a second guide means slot,
 wherein the first and the second guide means are positioned in the one of the slots such that a protruding portion of the first spacer faces a protruding portion of the second spacer and the first and the second guide means slots open toward each other, wherein a first winding conductor section of the first winding conductor is positioned within the first guide means slot, wherein a second winding conductor section of the second winding conductor is positioned within the second guide means slot, wherein the first spacer separates the first winding conductor section from the remainder of the first winding, and wherein the second spacer separates the second winding conductor section from the remainder of the second winding, the electric motor further comprising a clamping element having a base element and base clamp, the base clamp extending from the base element to a free end, wherein the base clamp comprises a first partial element and a second partial element, the first partial element having a taper in a direction from the base element to the free end, wherein the first partial element extends into the first and the second guide means slots such that the taper presses the first and the second winding conductor sections into the first and the second guide means slots, respectively, to retain the first and the second winding conductor sections within the first and the second guide means slots, and wherein the second partial element extends between the protruding portion of the first spacer and the protruding portion of the second spacer.

2. The electric motor according to claim 1, characterized in that the base clamp, specifically the first partial element of the base clamp, constitutes an electrical insulator.

3. The electric motor according to claim 1, characterized in that the base clamp insulates the first and second winding conductor sections from their surroundings.

4. The electric motor according to claim 1, characterized in that the taper of the first partial element (83) and/or a taper of the second partial element, in respective cross-section, are configured with a wedge-shaped, pyramidal or conical taper.

5. The electric motor according to claim 1, characterized in that the second partial element tapers over an entire length of the base clamp.

6. The electric motor according to claim 1, characterized in that at least a subregion of the base clamp, considered in cross-section, is configured with a T-shape.

7. The electric motor according to claim 1, characterized in that the first partial element extends over an entire length of the base clamp.

8. The electric motor according to claim 1, characterized in that the base element incorporates a locking means, and in that the armature incorporates a retention means, wherein the locking means and the retention means are configured such that the clamping element and the armature are connectable to each other in a detachable arrangement.

9. The electric motor according to claim 8, characterized in that the locking means has at least one latch, which engages with a recess in the retention means.

10. The electric motor according to claim 1, characterized in that the first and second winding conductors extend from the armature in an axial direction.

11. The electric motor according to claim 1, characterized in that the first and second guide means form part of an insulating element.

12. The electric motor according to claim 1, characterized in that the first and second guide means are configured such that the guide means slot can only accommodate one winding conductor section.

13. The electric motor according to claim 1, characterized in that the first and second guide means are configured on a slot base of the one of the slots.

14. The electric motor according to claim 1, characterized in that the first partial element and the second partial element are configured in a one-piece arrangement.

15. The electric motor according to claim 1, characterized in that the armature is an element of a stator of the electric motor.

16. The electric motor according to claim 1, characterized in that the base clamp in combination with the first and second guide means, insulates the first and second winding conductor sections from their surroundings.

17. The electric motor according to claim 1, characterized in that the base clamp insulates the first winding conductor section from the second winding conductor section.

18. The electric motor according to claim 1, characterized in that the first partial element extends over an entire length of the base clamp, and in that the first partial element and the second partial element are essentially of equal length.

19. The electric motor according to claim 1, characterized in that the base element is of an essentially annular design.

20. The electric motor according to claim 1, characterized in that the guide means forms part of and insulating element, which is configured on the armature in the region of the teeth and which separates the windings from the armature.

* * * * *